(12) United States Patent
Lo

(10) Patent No.: US 10,647,152 B2
(45) Date of Patent: May 12, 2020

(54) BICYCLE WHEEL RIM FOR TUBELESS WHEEL

(71) Applicant: CHENG SHIN RUBBER IND. CO., LTD., Chang-Hwa (TW)

(72) Inventor: Tsai Jen Lo, Chang-Hwa (TW)

(73) Assignee: Cheng Shin Rubber Industrial Co., Ltd., Tasuen, Changhua County (TW)

( * ) Notice: Subject to any disclaimer, the term of this patent is extended or adjusted under 35 U.S.C. 154(b) by 258 days.

(21) Appl. No.: 15/589,028

(22) Filed: May 8, 2017

(65) Prior Publication Data

US 2018/0319210 A1 Nov. 8, 2018

(51) Int. Cl.
| | | |
|---|---|---|
| B60B 21/02 | (2006.01) | |
| B60B 7/00 | (2006.01) | |
| B60B 7/04 | (2006.01) | |
| B60B 7/14 | (2006.01) | |
| B60B 7/06 | (2006.01) | |

(52) U.S. Cl.
CPC ............... *B60B 7/0013* (2013.01); *B60B 7/04* (2013.01); *B60B 7/063* (2013.01); *B60B 7/14* (2013.01); *B60B 2900/572* (2013.01)

(58) Field of Classification Search
CPC ......... B60B 7/0013; B60B 7/04; B60B 7/063; B60B 7/14; B60B 2900/572
USPC .................................. 301/95.102, 103, 104
See application file for complete search history.

(56) References Cited

U.S. PATENT DOCUMENTS

| | | | | |
|---|---|---|---|---|
| 5,988,764 | A * | 11/1999 | Deetz ...................... | B60B 21/04 152/381.3 |
| 6,145,936 | A * | 11/2000 | Alberti .................... | B60B 1/041 301/56 |
| 7,427,112 | B2 * | 9/2008 | Schlanger ............... | B60B 1/041 301/58 |
| 8,668,278 | B2 * | 3/2014 | Meggiolan ............ | B60B 21/025 301/55 |
| 2006/0273654 | A1 * | 12/2006 | Lien ........................ | B60B 1/041 301/95.104 |
| 2009/0134695 | A1 * | 5/2009 | Meggiolan ............ | B60B 21/025 301/95.106 |
| 2012/0062021 | A1 * | 3/2012 | Lew ........................ | B29C 70/44 301/95.103 |
| 2013/0099556 | A1 * | 4/2013 | Koshiyama ........... | B60B 21/025 301/95.104 |
| 2014/0132060 | A1 * | 5/2014 | Chen ...................... | B60B 21/106 301/95.104 |

* cited by examiner

*Primary Examiner* — S. Joseph Morano
*Assistant Examiner* — Jean W Charleston
(74) *Attorney, Agent, or Firm* — Rosenberg, Klein & Lee

(57) ABSTRACT

A bicycle wheel rim includes a rim having a hollow inner part and an outer part which is integrally formed with the inner part. An opening is defined in radial direction of the outer part. A connection unit is formed in the outer part and includes two seats located at an inner bottom of the opening, and two sidewalls extending from the two seats. Two engaging portions are respectively formed on the two seats and located apart from each other. Each sidewall has an outside, an inside and a top face which is connected between the outside and the inside. The inside is a flat inside without any lip or flange. The sidewalls have better strength and protect the sidewalls of the tire from being deformed.

11 Claims, 8 Drawing Sheets

BICYCLE WHEEL RIM FOR TUBELESS WHEEL

BACKGROUND OF THE INVENTION

1. Fields of the Invention

The present invention relates to a bicycle wheel rim, and more particularly, to a bicycle wheel rim for tubeless wheel, the rim maintains pressure of the tire and reduces wind resistance and deformation.

2. Descriptions of Related Art

The conventional bicycle wheels generally comprise a rim and a tire is connected to the outer periphery of the rim. The tires of the bicycle wheels can be a tube or a clincher, wherein the tube has 0-shaped cross section, and the clincher includes a U-shaped cross section which includes two sidewalls and a lip is formed on each of the sidewalls. The clincher can be catalogued to be tube type or tubeless type.

The bicycle wheel rims includes a circular part with a hub located at the center of the circular part, and multiple spokes are connected between the inner periphery of the circular part and the hub. The rim cooperated with a clincher includes two sidewalls extending from two sides along the outer periphery thereof such that the lips of the tire are engaged with the two sidewalls. There is no tube located between the clincher and the rim so that the lips are required to be air-tightly connected to the sidewalls of the rim.

It is noted that when the tire is connected to the rim, the lips of the tire go over the edges of the sidewalls of the rim so as to mount the tire to the rim. The sidewalls of the tire are deformed when the lips go over the sidewalls, so that the sidewalls of the tires are weakened. Besides, in order to ensure no leakage between the lips of the tire and the sidewalls of the rim, each of the sidewalls of the rim is formed with an engaging portion which is used to be engaged with the lips of the tire. The engaging portion of each of the sidewalls of the rim makes the manufacturing cost increase, and the sidewalls of the rim are weakened and may be deformed by impact.

The present invention intends to provide a bicycle wheel rim that is cooperated with a clincher, and the bicycle wheel rim eliminates the shortcomings mentioned above.

SUMMARY OF THE INVENTION

The present invention relates to a bicycle wheel rim and comprises a rim having a hollow inner part and an outer part which is integrally formed with the inner part. The outer part has an opening defined in radial direction thereof. A connection unit is formed in the outer part and has two seats and two sidewalls which respectively extend from the two seats. The two seats are located at an inner bottom of the opening, and a bridge is connected between the two seats. The opening is defined between the two sidewalls and the seats. Two engaging portions are respectively formed on the two seats and located apart from each other. Each engaging portion is located a distance from the sidewall corresponding thereto. Each sidewall has an outside, an inside and a top face which is connected between the outside and the inside. The inside is a flat inside without any lip or flange. The sidewalls, the seats and the engaging portions secure lips of a tire.

The primary object of the present invention is to provide a bicycle wheel rim wherein the inside of each sidewall of the outer part is a flat inside without any lip or flange. The flat inside of each wall is easily manufactured and reduces deformation of the sidewalls of the tire when the tire is connected to the rim.

Another object of the present invention is to provide a bicycle wheel rim wherein each sidewall of the outer part does not have any lip or flange protruding therefrom such that the aero-assistance is reduced.

Yet another object of the present invention is to provide a bicycle wheel rim wherein each sidewall of the outer part does not have any lip or flange protruding therefrom such that the strength of the sidewalls of the rim is increased.

A further object of the present invention is to provide a bicycle wheel rim wherein each sidewall of the outer part does not have any lip or flange protruding therefrom, the contact area between the rim and the lips of the tire is increased so that the tire is air-tightly connected to the rim to avoid from leakage.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
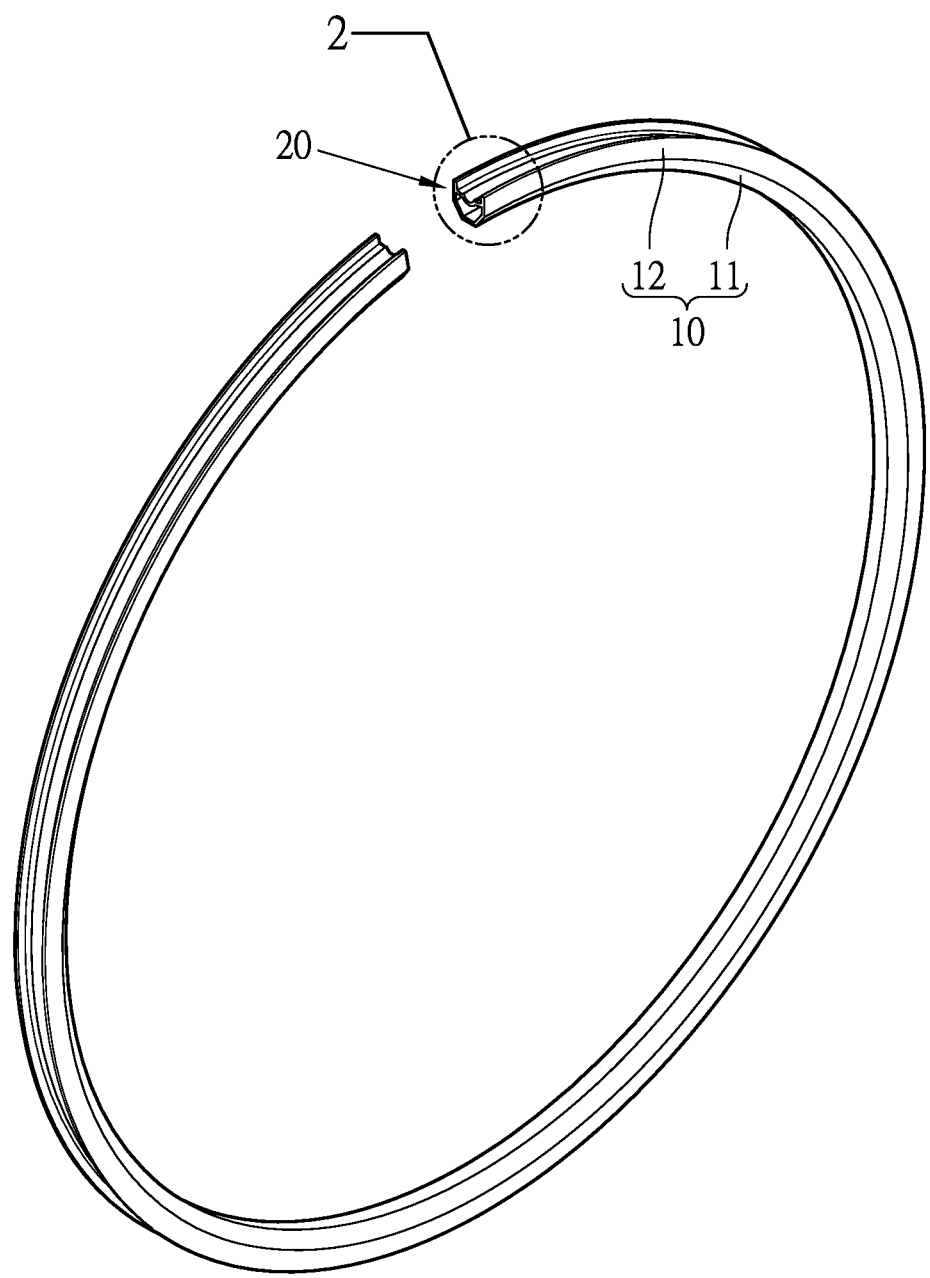
FIG. 1 is a perspective view of the bicycle wheel rim of the present invention.
Figure 2:
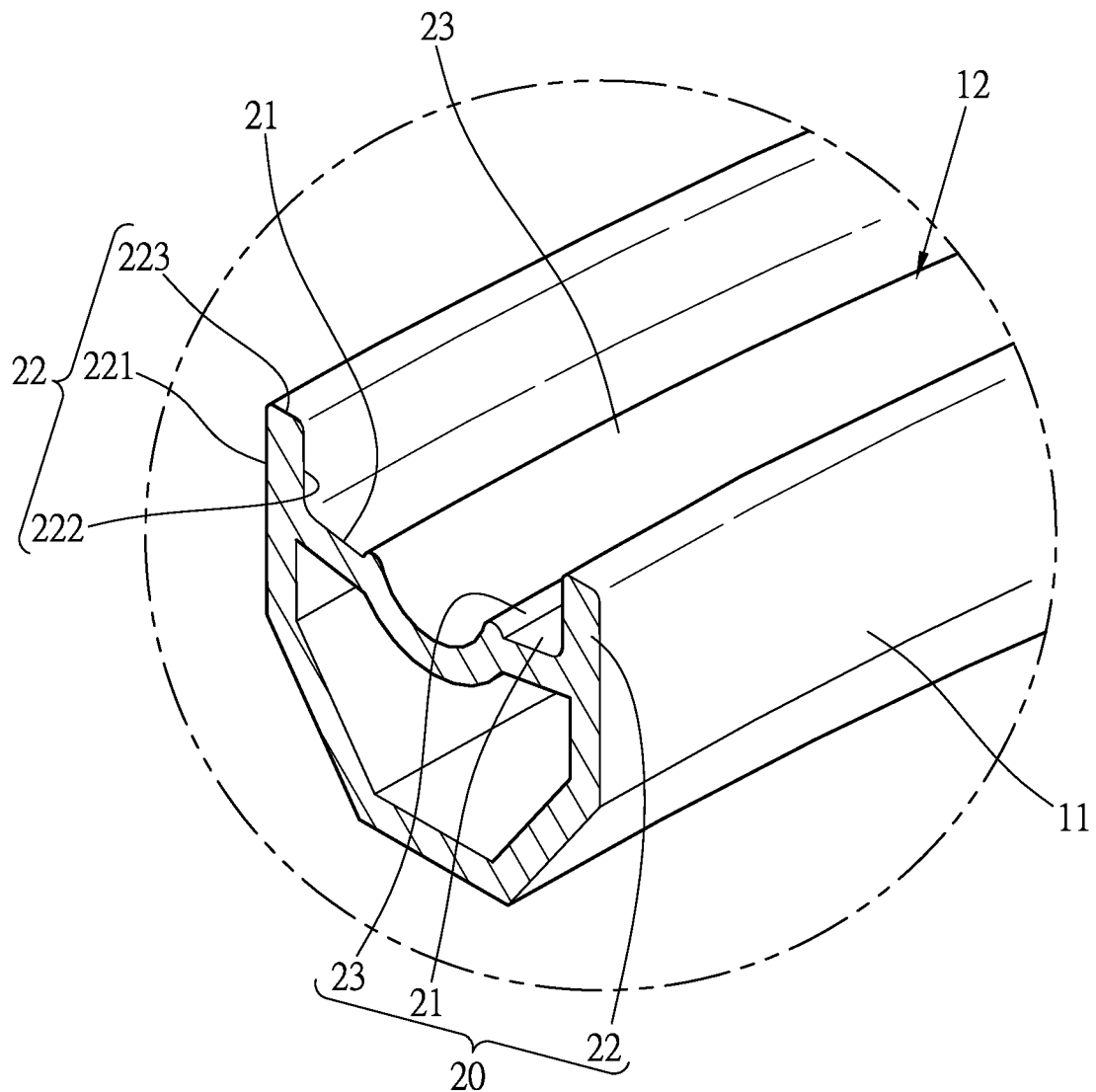
FIG. 2 shows the cross section of the bicycle wheel rim of the present invention.
Figure 3:
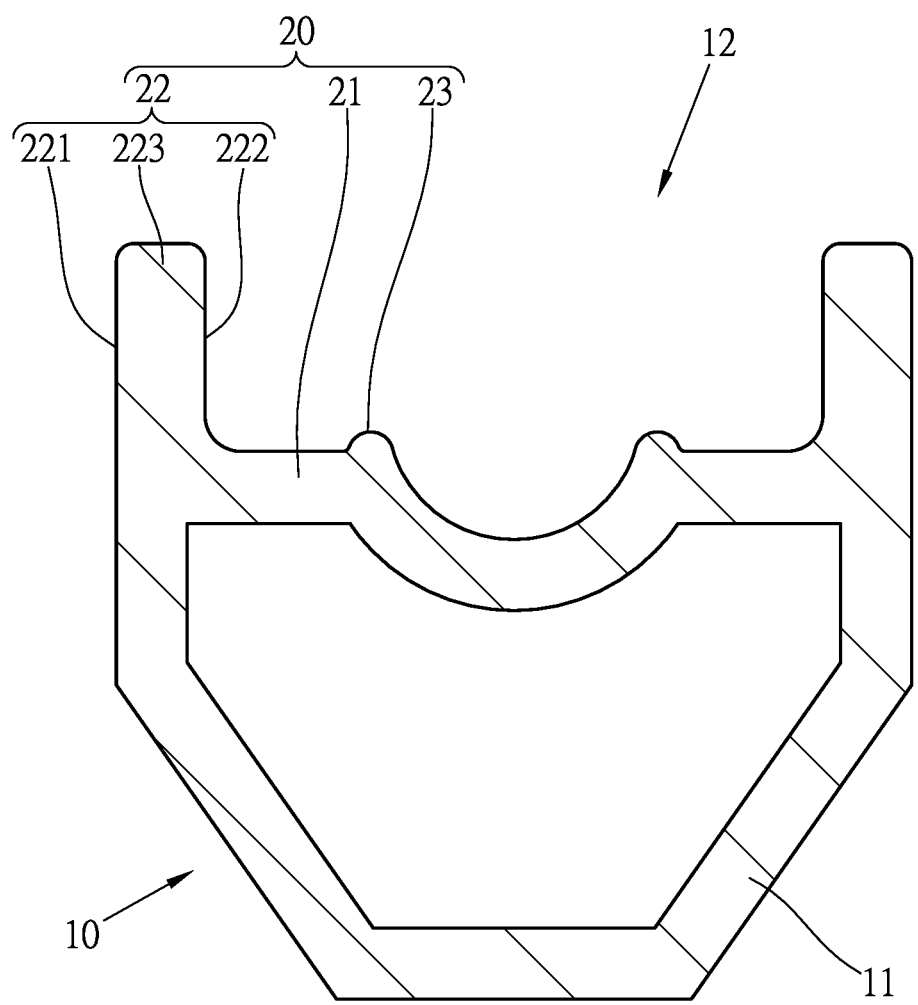
FIG. 3 is a cross sectional view of the bicycle wheel rim of the present invention.

Referring to FIGS. 1 to 3, the bicycle wheel rim of the present invention comprises a rim 10 having an inner part 11 and an outer part 12 which is integrally formed with the inner part 11. The inner part 11 is a hollow part. The outer part 12 has an opening defined in radial direction thereof.

A connection unit 20 is integrally formed with the outer part 12 and has two seats 21 and two sidewalls 22 which respectively extend from the two seats 21. The two seats 21 are located at the inner bottom 12 of the opening, and a bridge is connected between the two seats 21. The opening is defined between the two sidewalls 22, the seats 21 and the bridge. Two engaging portions 23 are respectively formed on the two seats 21 and located apart from each other. Each engaging portion 23 is located a distance from the sidewall 22 corresponding thereto. Each sidewall 22 includes an outside 221, an inside 222 and a top face 223 which is connected between the outside 221 and the inside 222. Each inside 222 is connected to the top face 223 by a rounded edge. The inside 222 is a flat inside without any lip or flange extending therefrom. The sidewalls 22 extend perpendicularly relative to the axis of the bicycle wheel rim 10. An angle α between 70 to 150 degrees is defined between each sidewall 22 and seat 21 corresponding thereto. In this embodiment, the angle α is 90 degrees.

Each sidewall 22 of the outer part 12 of the rim 10 does not have any lip or flange protruding therefrom so that the strength of the sidewalls 22 of the rim is increased and increases life of use of the rim 10. The contact area between the rim 10 and the lips 51 of the tire 50 is increased so that the tire 50 is air-tightly connected to the rim 10 to avoid from leakage.

Figure 4:
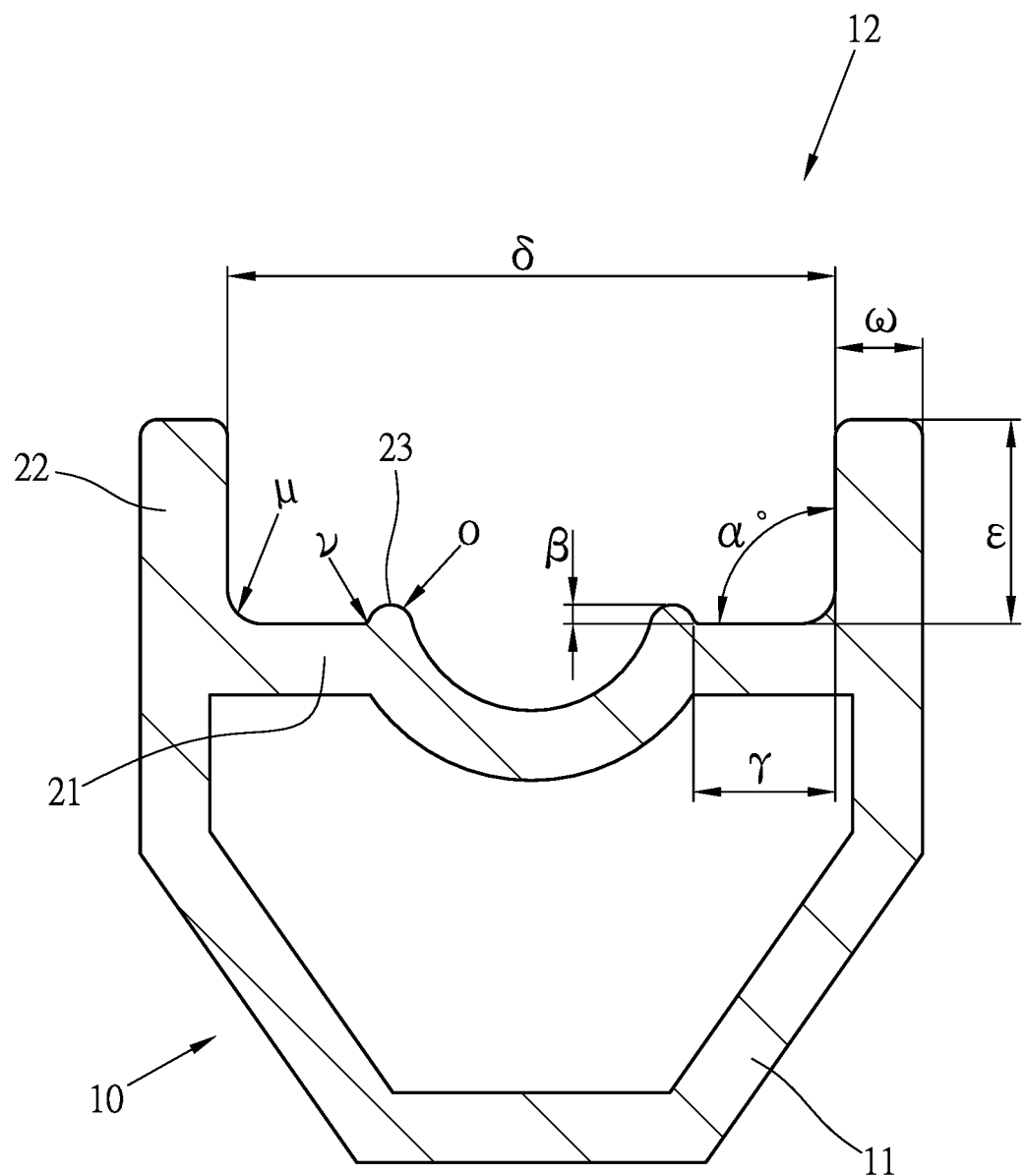
FIG. 4 is a cross sectional view of the bicycle wheel rim of the present invention to show the specific details of sizes of each portion thereof.

As shown in FIG. 4, the inner part 11, the outer part 12 and the connection unit 20 are integrally formed as one-piece. The angle α between 70 to 150 degrees is defined between each sidewall 22 and seat 21 corresponding thereto. Each sidewall 22 extends a height ε of 2 to 8 mm from the seat 21 corresponding thereto. The width δ of 10 to 35 mm is defined between two respective insides 222 of the two sidewalls 22. Each sidewall 22 has a thickness co of 1 to 2.5 mm A distance γ of 1 to (δ−5)/2 mm is defined between the inside 222 of each sidewalls 22 and the engaging portion 23 corresponding thereto. The distance γ is the width of each of the seats 21. A rounded corner μ of 0 to 2 mm is formed at a connection portion between each of the sidewalls 22 and the seat 21 corresponding thereto. The height difference β is 0.1 to 1.0 mm is defined between the top point of each engaging portion 23 and the top surface of the seat 21 corresponding thereto. Each of the engaging portions 23 includes a curved protrusion o, and the curvature of the curved protrusion o is 0.3 to 2 mm A rounded curve v of 0.3 to 2 mm is formed at the connection portion between the curved protrusion o of each of the engaging portions 23 and the seat 21 corresponding thereto.

Figure 5:
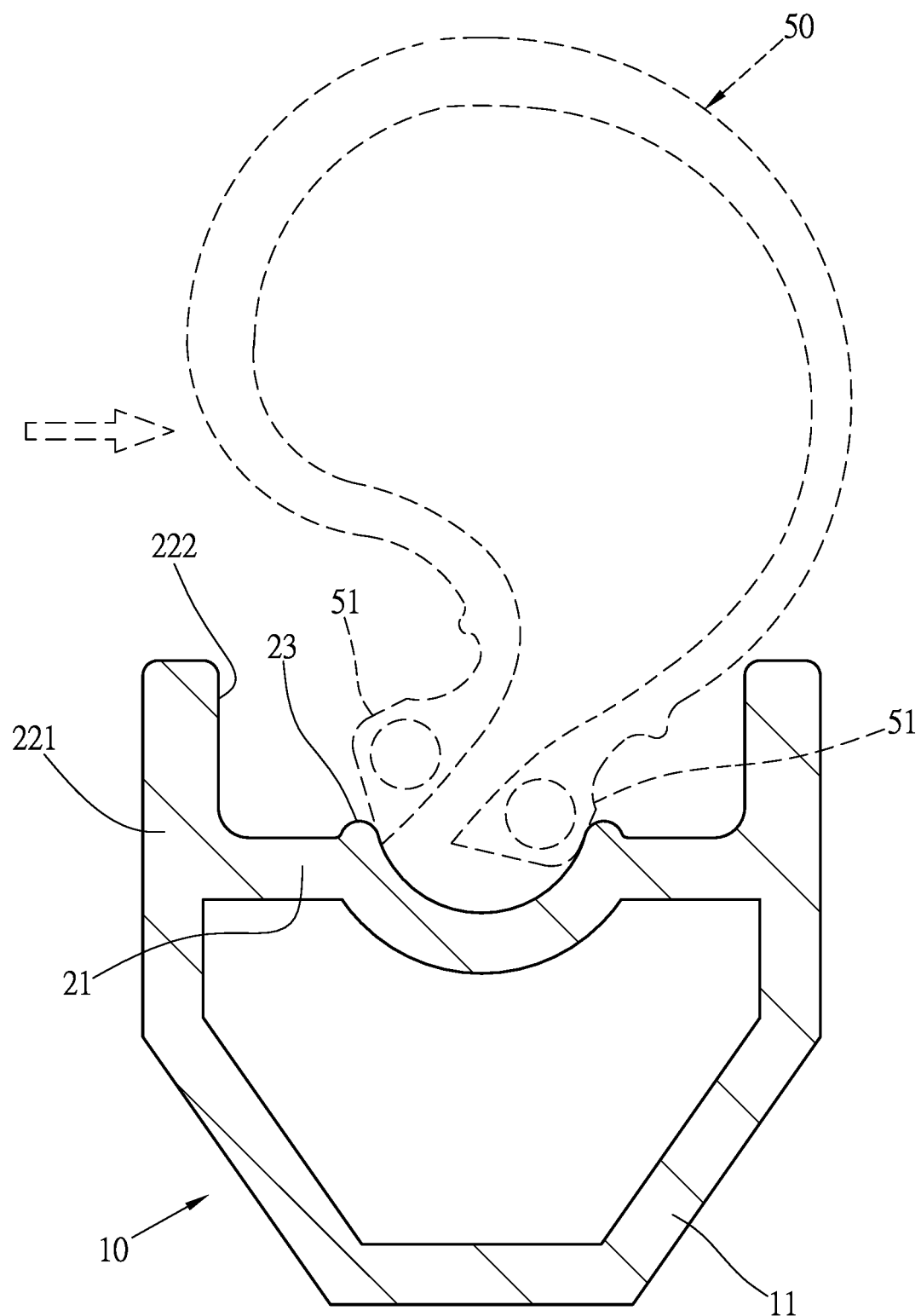
FIGS. 5 to 7 shows the steps for installation a tire to the bicycle wheel rim of the present invention.
Figure 6:
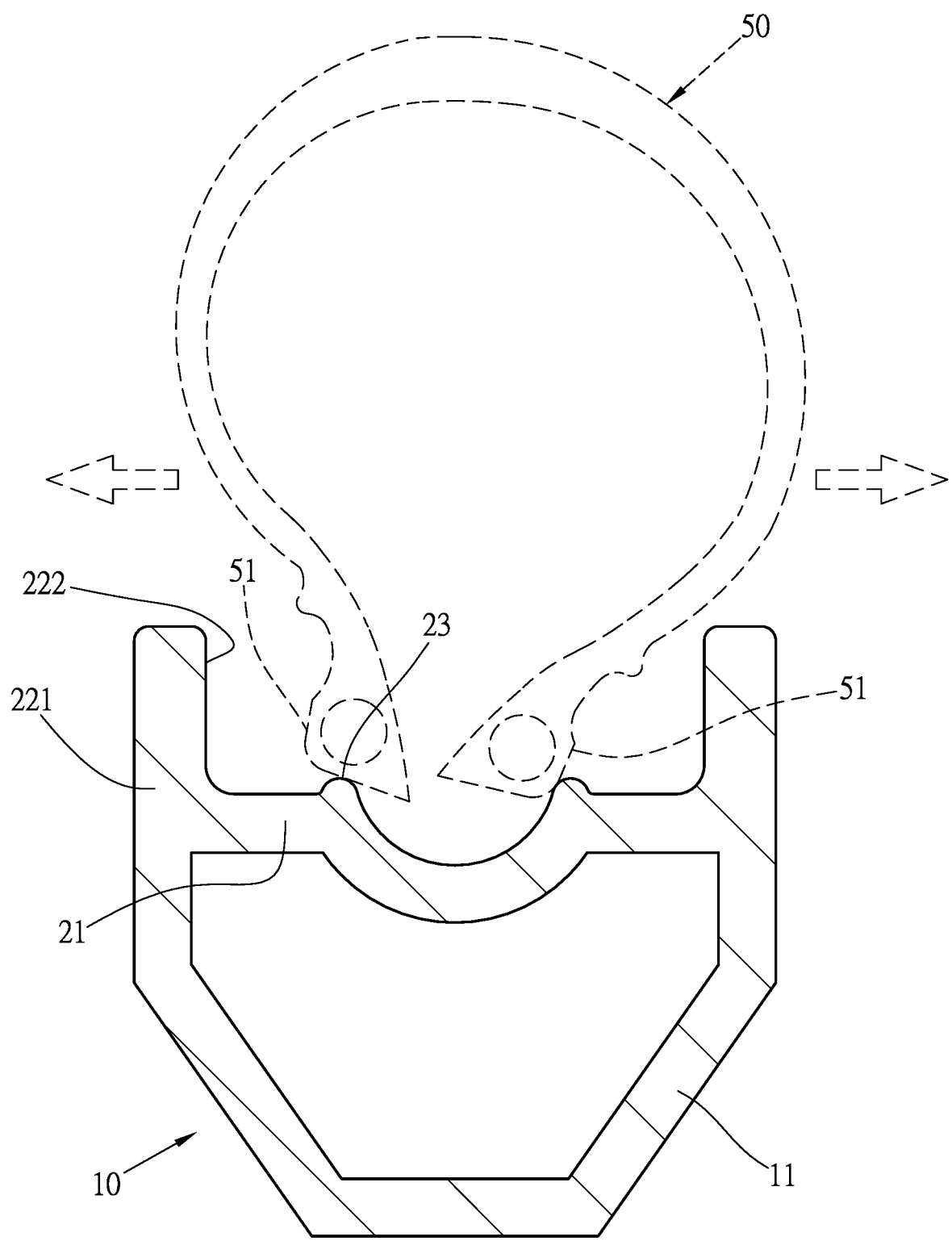
Figure 7:
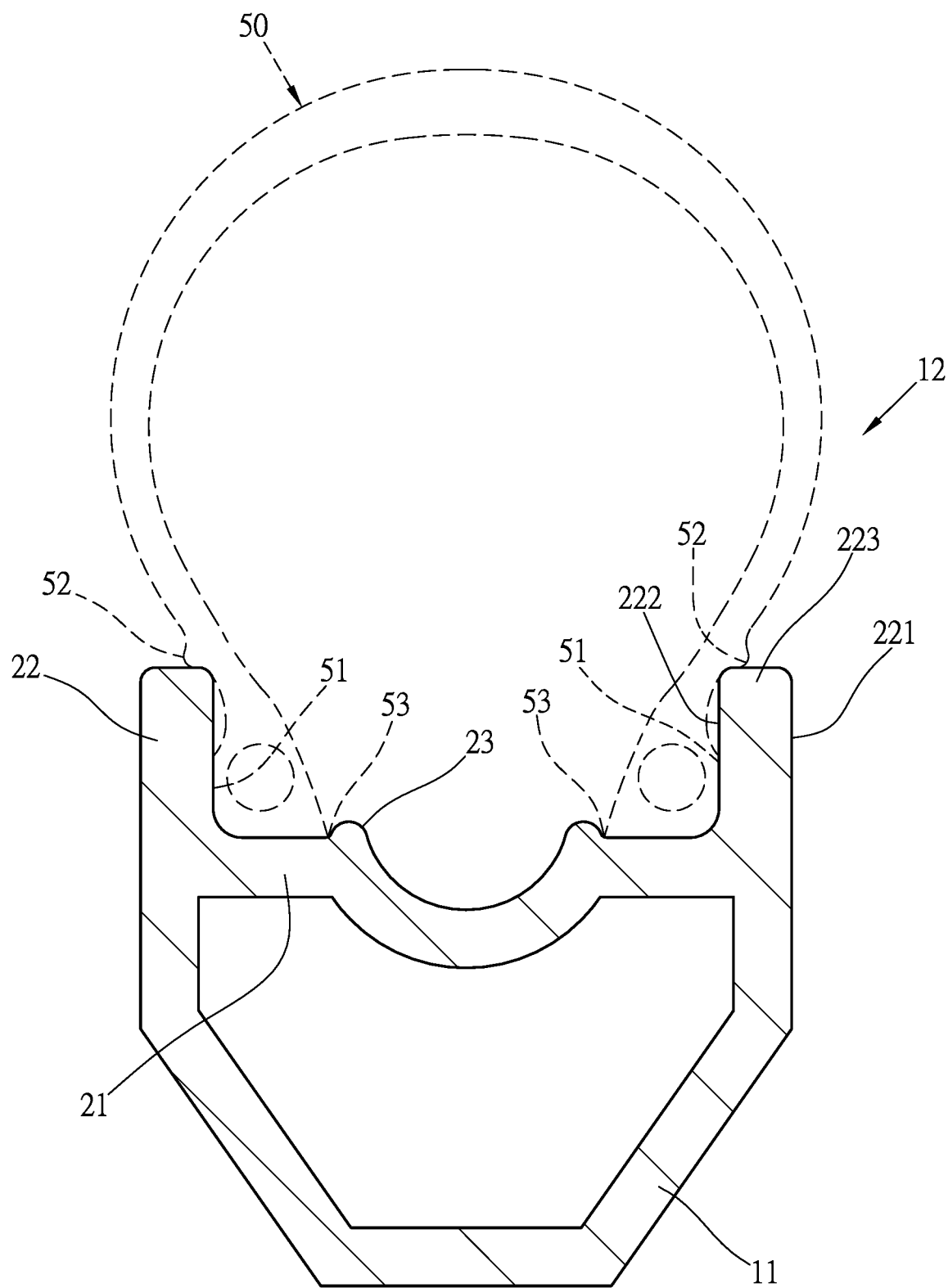

As shown in FIG. 5, the tire 50 (as disclosed in phantom lines) includes a first engaging ridge 52 formed on outer surface of each sidewall of the tire 50, and the first engaging ridge 52 is located above the lip 51 of corresponding thereto. A second engaging ridge 53 is formed on inner surface of each lip 51 of the tire 50. When in installation, one sidewall of the tire 50 is positioned inside of the outer part 12, and the other sidewall of the tire 50 is deformed by applying a force thereto and positioned inside of the outer part 12 as shown in FIG. 6. The tire 50 is inflated so that the two sidewalls of the tire 50 expand and move toward the sidewalls 22 of the rim 10. As shown in FIG. 7, when the tire 50 is inflated completely, the tire 50 is secured to the inside of the outer part 12. The second engaging ridges 53 contact the engaging portions 23. The first engaging ridges 52 are engaged with the top faces 223 of the sidewalls 22 of the rim 10. Each lip 51 of the tire 50 is fully matched with the inside 222 and the top surface of the seat 21.

The inside 222 of each sidewall 22 of the rim 22 is a flat inside without any protrusion so as to form an L-shaped room to accommodate the lip 51 of the tire 50.

The advantages of the present invention includes the following advantages which are that there is no flange or lip extending from the sidewalls 22 of the rim 10, the structure of the rim 10 becomes simple and easily to be manufactured.

The machine and equipment to be used to manufacture the rim 10 is simplified and therefore reduce the manufacturing cost.

The lips 51 of a tire 50 to be installed to the rim 10 are put in the outer part 12 so that the sidewalls of the tire 50 are not deformed severely. The volume in the tire 50 is increased and the rolling resistance is reduced.

The sidewalls 22 of the rim 10 do not have any protrusion so that the strength of the rim 10 is reinforced which increases life of use of the rim 10.

The lips 51 of the tire 50 installed to the rim 10 of the present invention are matched to the insides 223 of the sidewalls 22 and the top surfaces of the seats 21. The contact area between the lips 51 and the outer part 12 is increased and has better air-tight features, so that the leakage can be avoided.

Figure 8:
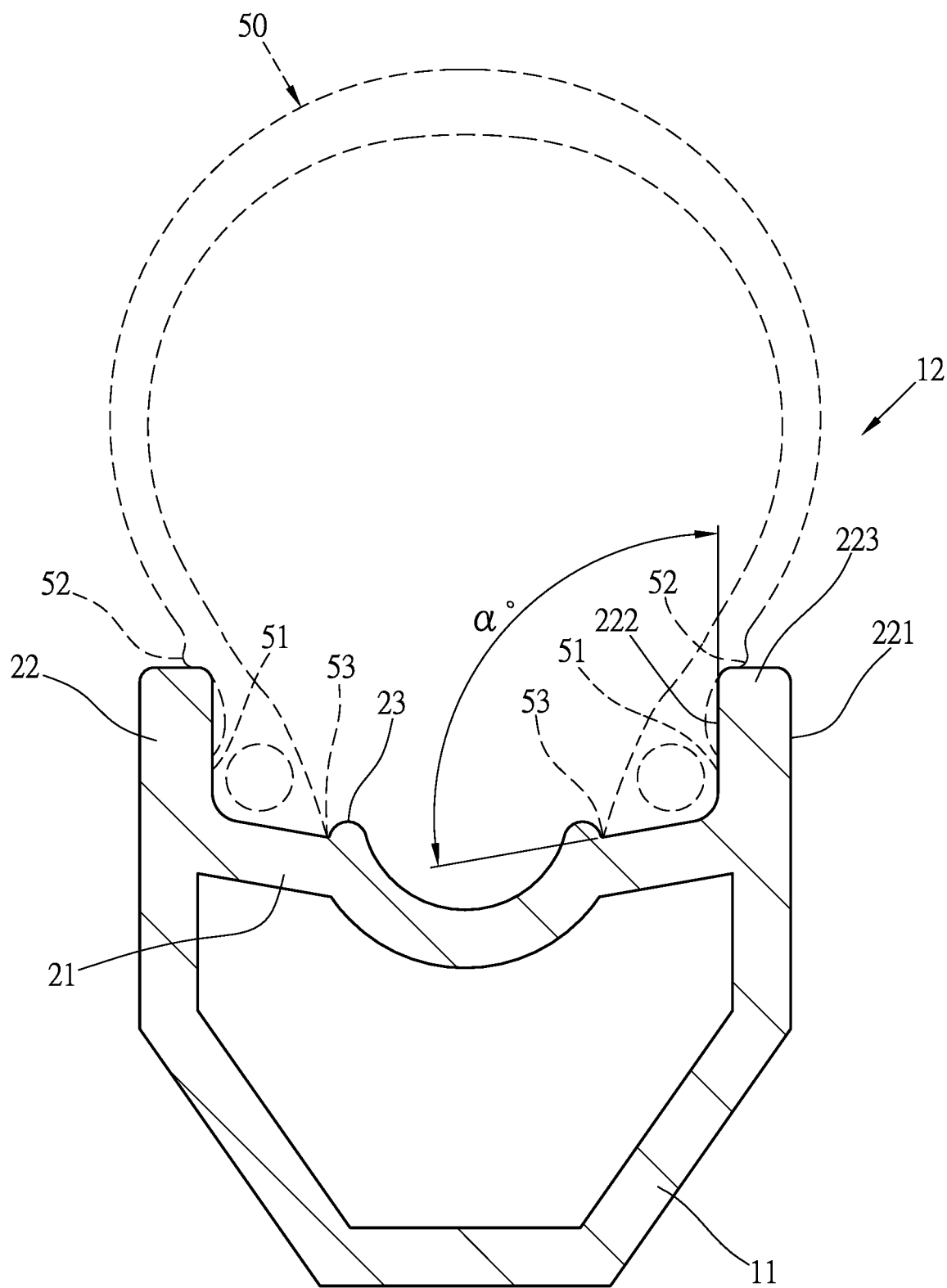
FIG. 8 shows that the tire is connected to the bicycle wheel rim of the present invention.

As shown in FIG. 8, the angle α is an obtuse angle which is larger than 90 degrees, and the lips 51 of the tire 50 can also be matched with the insides 222 and the top surfaces of the seats 21.

The rim 10 of the present invention does not have any lip or flange extending from the sidewalls 22 of the outer part 12, the structure is simplified and includes more advantages than the conventional rims as mentioned above.

While we have shown and described the embodiment in accordance with the present invention, it should be clear to those skilled in the art that further embodiments may be made without departing from the scope of the present invention.

What is claimed is:

1. A bicycle wheel rim comprising:
   a rim having an inner part and an outer part integrally formed with the inner part, the inner part forming a hollow part, the outer part having an opening radially directed therefrom, and
   a connection unit formed in the outer part and having:
     two seats and two sidewalls respectively extending from the two seats on opposite sides of the opening, the two seats located at an inner bottom of the opening,
     a bridge connected between the two seats, the opening being defined between the two sidewalls and the seats,
     two engaging portions respectively formed on the two seats and located apart from each other, each engaging portion offset by one of the seats from one sidewall corresponding thereto, each sidewall having an outside, an inside, and a top face extending between the outside and the inside, the inside defining a surface having a substantially flat profile without protrusion into the opening in a direction parallel to an axis of the bicycle wheel rim,
     wherein the sidewalls, the seats, and the engaging portions are configured to each engage lips of a tire secured thereto.

2. The bicycle wheel rim as claimed in claim 1, wherein each inside is connected to the top face corresponding thereto by a rounded edge.

3. The bicycle wheel rim as claimed in claim 1, wherein the sidewalls extend perpendicularly relative to the axis of the bicycle wheel rim, and an angle between 70 to 150 degrees is defined between each sidewall and seat corresponding thereto.

4. The bicycle wheel rim as claimed in claim 1, wherein each sidewall extends a height of 2 to 8 mm from the seat corresponding thereto.

5. The bicycle wheel rim as claimed in claim 1, wherein a width of 10 to 35 mm is defined between two respective insides of the two sidewalls.

6. The bicycle wheel rim as claimed in claim 1, wherein each sidewall has a thickness of 1 to 2.5 mm.

7. The bicycle wheel rim as claimed in claim 1, wherein a rounded corner of 0 to 2 mm is formed at a connection portion between each of the sidewalls and the seat corresponding thereto.

8. The bicycle wheel rim as claimed in claim 1, wherein a height difference of 0.1 to 1.0 mm is defined between a top point of each engaging portion and a top surface of the seat corresponding thereto.

9. The bicycle wheel rim as claimed in claim 1, wherein each of the engaging portions includes a curved protrusion, and a curvature of the curved protrusion is 0.3 to 2 mm.

10. The bicycle wheel rim as claimed in claim 9, wherein a rounded curve of 0.3 to 2 mm is formed at a connection portion between the curved protrusion of each of the engaging portions and the seat corresponding thereto.

11. The bicycle wheel rim as claimed in claim 1, wherein a width δ of 10 to 35 mm is defined between two respective insides of the two sidewalls, a distance γ of 1 to (δ−5)/2 mm is defined between the inside of each sidewall and the engaging portion corresponding thereto, and the distance γ defines a width of each of the seats.

\* \* \* \* \*